United States Patent

Takanishi et al.

[11] Patent Number: 5,597,198
[45] Date of Patent: Jan. 28, 1997

[54] FRONT BODY STRUCTURE FOR MOTOR VEHICLE

[75] Inventors: Toshiaki Takanishi; Moriyuki Ohno, both of Hamamatsu, Japan

[73] Assignee: Suzuki Motor Corporation, Shizuoka-ken, Japan

[21] Appl. No.: 265,408

[22] Filed: Jun. 24, 1994

[30] Foreign Application Priority Data

Dec. 17, 1993 [JP] Japan ..................... 5-317736

[51] Int. Cl.⁶ ..................... B62D 25/08
[52] U.S. Cl. ..................... 296/194; 280/480; 296/203; 410/23
[58] Field of Search ..................... 296/194, 198, 296/203; 280/762, 480; 410/11, 23; 414/563, 462

[56] References Cited

U.S. PATENT DOCUMENTS 4,919,474  4/1990  Adachi et al. ..................... 296/194
5,031,958  7/1991  Fujita et al. ..................... 296/194

FOREIGN PATENT DOCUMENTS 7618270  10/1976  Germany.
3141213   5/1985  Germany.
63-312279 12/1988  Japan ..................... 296/203

Primary Examiner—David M. Mitchell
Assistant Examiner—Kia M. Robinson
Attorney, Agent, or Firm—Arnold, White & Durkee

[57] ABSTRACT

An extension member 12 is subassembled to a fender apron 3a, 3b by welding the rear end portion 26 of the extension member 12 to the front end portion 27 of the fender apron 3a, 3b, and the fender apron 3a, 3b is welded to a lamp support panel 2a, 2b in the condition where the interface P between the extension member 12 and the fender apron 3a, 3b is disposed substantially in the front and rear direction of the vehicle body, so that when a load in the front and rear direction is applied to the extension member 12, the load acts as a shearing force on the welded portion $S_4$ of the extension member 12 and the fender apron 3a, 3b.

6 Claims, 5 Drawing Sheets

FRONT BODY STRUCTURE FOR MOTOR VEHICLE

FIELD OF THE INVENTION AND RELATED ART STATEMENT

The present invention relates to a front body structure for a motor vehicle and, more particularly to a welded structure of extension member at a joint between a lamp support panel and a fender apron.

FIGS. 4 to 7 show a conventional front body structure of a motor vehicle. In FIG. 4, reference numeral 1 denotes an engine room, 2a and 2b denote a pair of lamp support panels disposed at both sides in front of the engine room 1, 3a and 3b denote a pair of fender aprons disposed at both right and left sides of the engine room 1, 4 denotes a hood lock member to which a lock member is installed to lock a not illustrated front hood in a closed condition, 5 denotes a dash panel for separating the engine room 1 from the cabin, and 6 denotes a cowl top panel disposed at the upper part of the dash panel 5.

The aforementioned hood lock member 4 is mounted between the upper parts of the fender aprons 3a and 3b, and its both ends 4a and 4b are joined to the upper parts of the lamp support panels 2a and 2b and fixed to them by welding or other methods as shown in FIGS. 4 and 5. Thereby, the hood lock member 4 is mounted between the front parts of the fender aprons 3a and 3b. Between the lower parts of the lamp support panels 2a and 2b, a cross member 7 is mounted as shown in FIG. 5. Thus, the lamp support panels 2a and 2b, the hood lock member 4, and a cross member 7 forms a front end assembly 8.

The fender apron 3a, 3b comprises an apron body 10, an apron side member (apron side inner panel) 11 which is welded to the lower edge of the apron body 10, and an extension member (apron side outer panel) 12 which is arranged so as to correspond to the front end 11a of the apron side member 11 and assembled thereto. The front ends 11a of the fender apron 3a and 3b are assembled and welded to paired lamp support panels 2a and 2b, respectively, as shown in FIGS. 5 to 7.

Specifically, the front end 11a of the apron side member 11 is inserted into the opening 14a, 14b in the lamp support panel 2a, 2b from the rear side of the lamp support panel 2a, 2b as indicated by the arrow R in FIG. 5, and is protruded to the front side of the lamp support panel 2a, 2b (see FIG. 6). As shown in FIG. 7, the bent portion 15 of the fender apron 3a, 3b is joined to the rear surface of the lamp support panel 2a, 2b. To the portion where the front edge 11a protrudes is assembled a U-shaped extension member 12 so that these two members form a closed cross section shape portion, and the bent portion 12a of the extension member 12 is joined to the front surface 17 of the lamp support panel 2a, 2b.

Thus, the lamp support panel 2a, 2b is held between the bent portion 15 of the fender apron 3a, 3b and the bent portion 12a of the extension member 12. Under this condition, three members are joined as a unit by spot welds $S_1$, by which the front portion of the vehicle body is assembled.

However, the conventional front body structure of a motor vehicle as described above has such problems as described below because spot welding is performed with the lamp support panel 2a, 2b being held between the fender apron 3a, 3b and the extension member 12. When the motor vehicle is towed by using a towing hook (not shown) mounted on the extension member 12, the fender apron 3a, 3b and the extension member 12 are subjected to a tractive force directed in the direction indicated by the arrow F in FIG. 7 (vehicle front direction), so that this tractive force acts as a separating force (pulling force) to the spot welds $S_1$. For this reason, the breakage of the spot welds $S_1$ occurs, and accordingly there is a possibility of the extension member 12 being separated from the lamp support panel 2a, 2b. Thus, this structure has a problem of insufficient strength for holding the extension member 12.

Further, to assemble the vehicle parts in front of the engine room 1, a total of five parts, that is, one front end assembly 8 comprising the lamp support panels 2a and 2b, the hood lock member 4, and the cross member 7, which have been assembled beforehand, a pair of fender aprons 3a and 3b, and a pair of extension members 12, must be prepared separately for assembling. Therefore, troublesome assembling work is another problem.

OBJECT AND SUMMARY OF THE INVENTION

The present invention has been made to solve the above problems. Accordingly, an object of the present invention is to provide a front body structure for a motor vehicle, which is not affected by a pulling force acting on a towing hook without separation of extension member, and is adapted to simplified assembling work of the front portion of the vehicle body.

To achieve the above object, the present invention provides a front body structure for a motor vehicle in which the tip end portion of an apron side member composing part of a fender apron is inserted into an opening of a lamp support panel disposed at each side of the front portion of a vehicle body, and is protruded to the front side of the lamp support panel, and the lamp support panel, the fender apron, and an extension member are welded in the condition where the extension member is disposed to the tip end portion of the protruded apron side member, wherein the extension member is subassembled to the fender apron by welding the rear end portion of the extension member to the front end portion of the fender apron, and the fender apron is welded to the lamp support panel in the condition where the interface between the extension member and the fender apron is disposed substantially in the front and rear direction (the longitudinal direction) of the vehicle body, so that when a load in the front and rear direction is applied to the extension member, the load acts as a shearing force on the welded portion of the extension member and the fender apron.

According to the constitution described above, the joint portion of the extension member and the fender apron is disposed substantially along the front and rear direction of the vehicle body and the portion is welded, so that when a load in the longitudinal direction is applied to the extension member via the towing hook, the load acts in the shearing direction with respect to the welded portion. For this reason, the load acts as a shearing force on the welded portion of the extension member and the fender apron, so that the separation of welded portion can be prevented effectively Also, the extension member can be welded to the fender apron beforehand and can be assembled into a front end assembly together with the paired lamp support panels, by which the jigs required for the assembling work of the front portion of the vehicle body can be simplified.

DETAILED DESCRIPTION OF PREFERRED EMBODIMENTS

Figure 1:
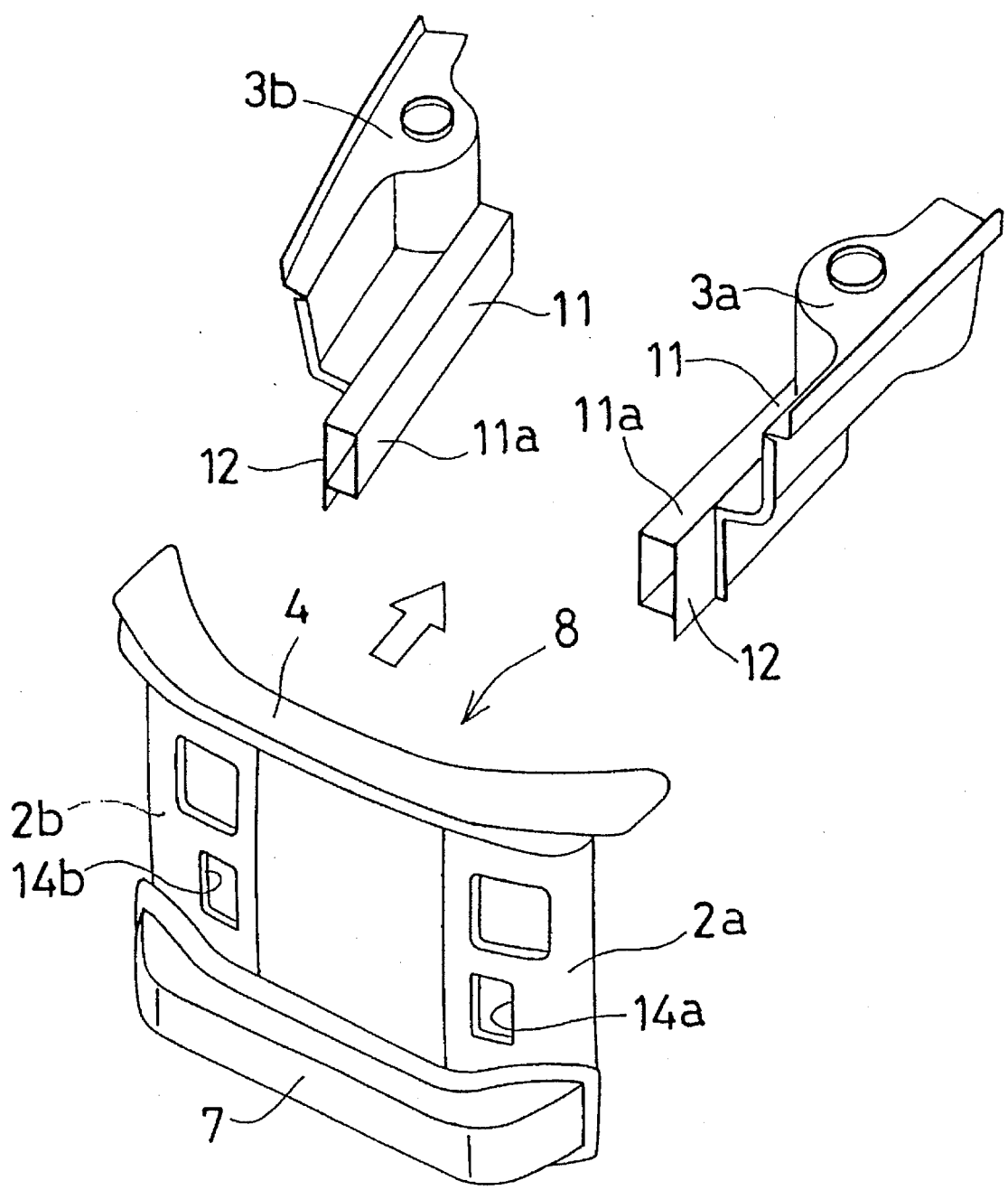
FIG. 1 is an exploded perspective view of a front body structure of a motor vehicle in accordance with the present invention.
Figure 2:
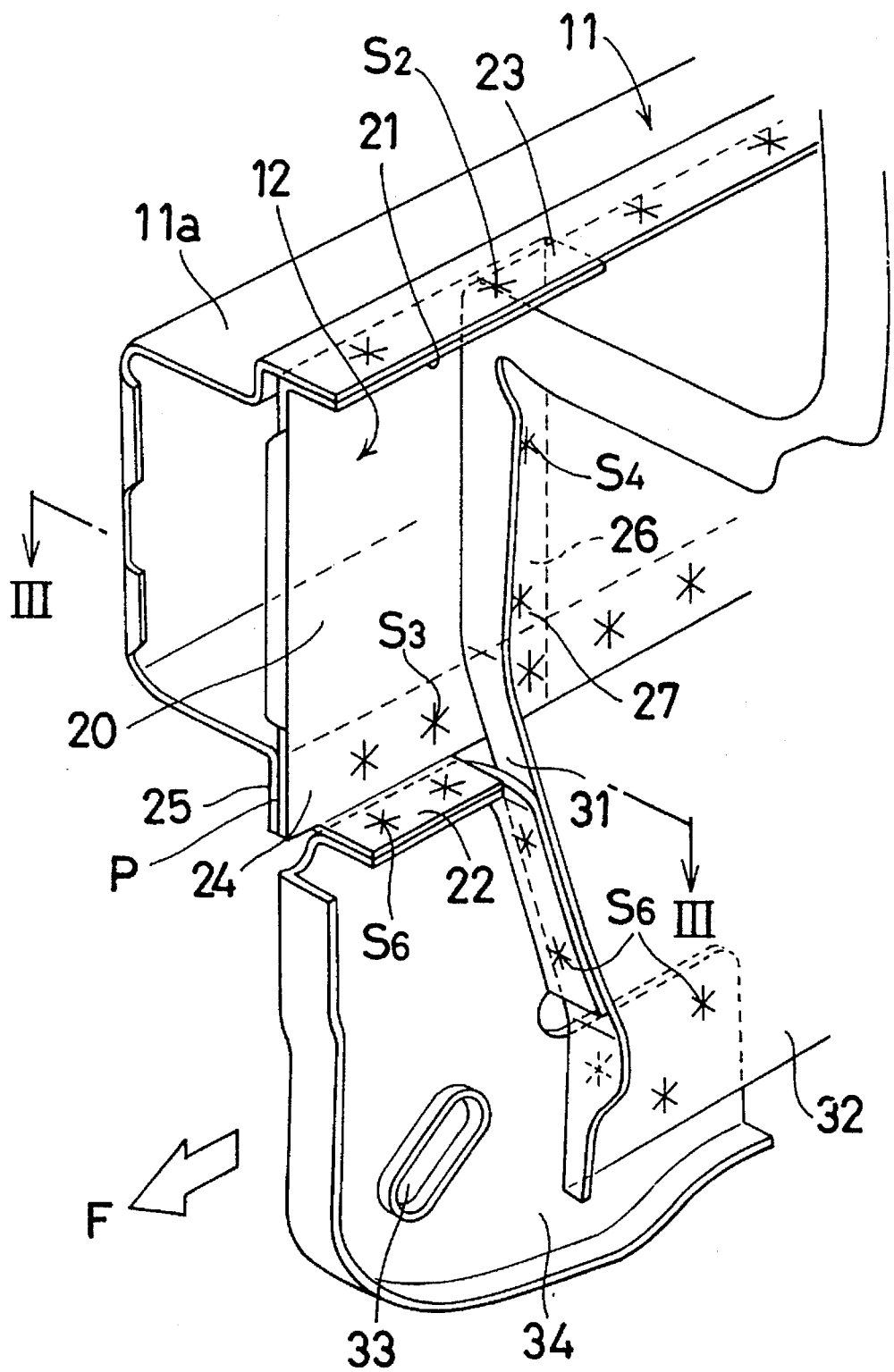
FIG. 2 is a perspective view of the main part of the front body structure of the motor vehicle in accordance with the present invention.
Figure 3:
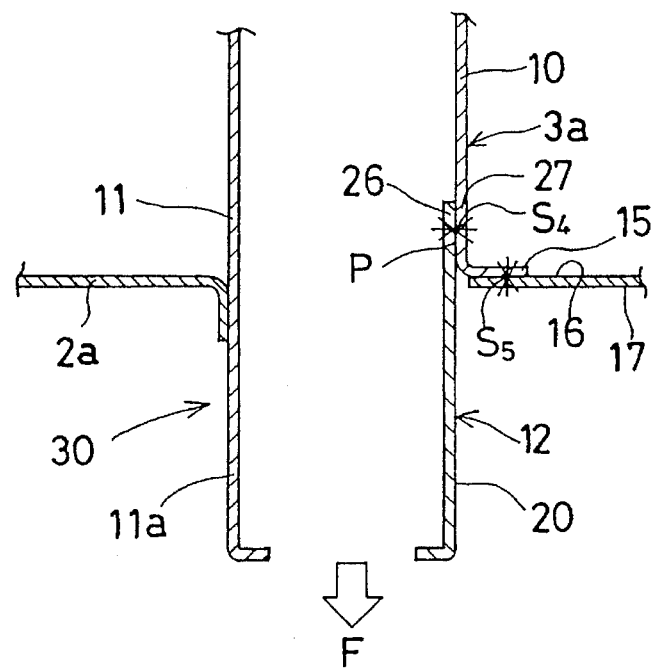
FIG. 3 is a sectional view taken along the line III—III of FIG. 2.
Figure 4:
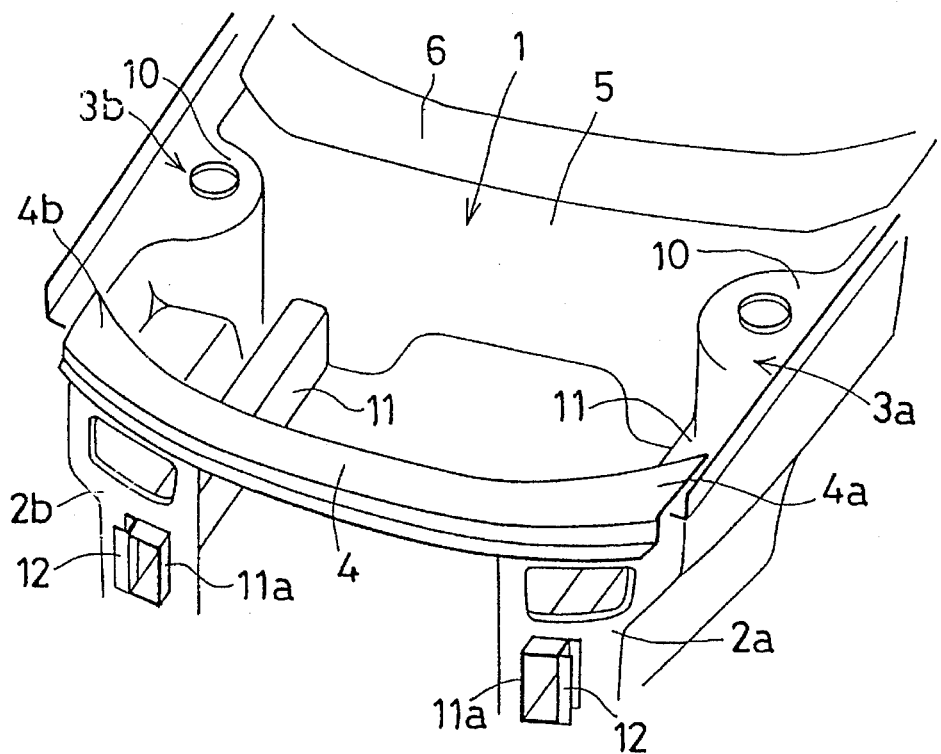
FIG. 4 is a perspective view of a conventional vehicle front part of a motor vehicle.
Figure 5:
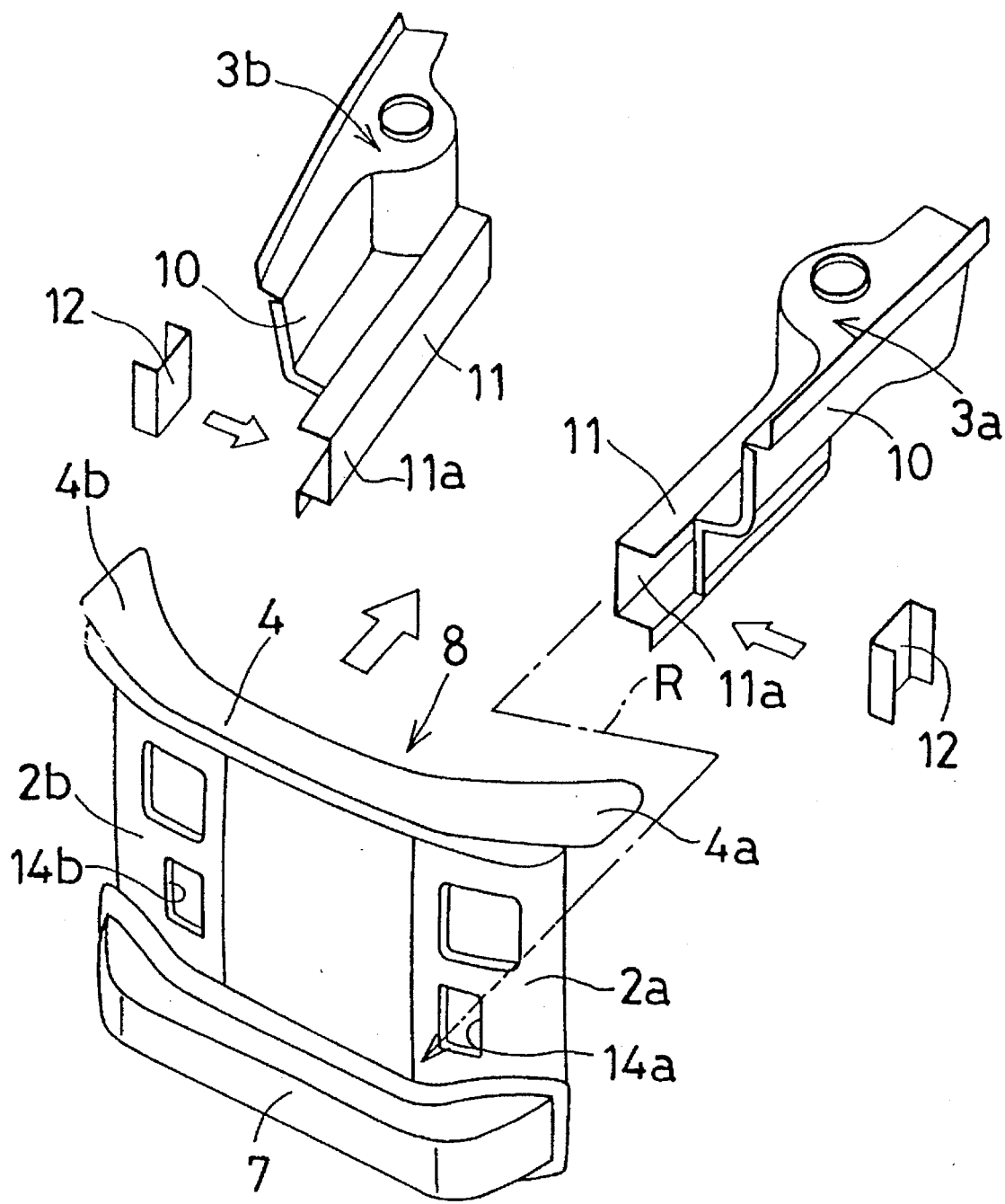
FIG. 5 is a exploded perspective view of a conventional front body structure of a motor vehicle.
Figure 6:
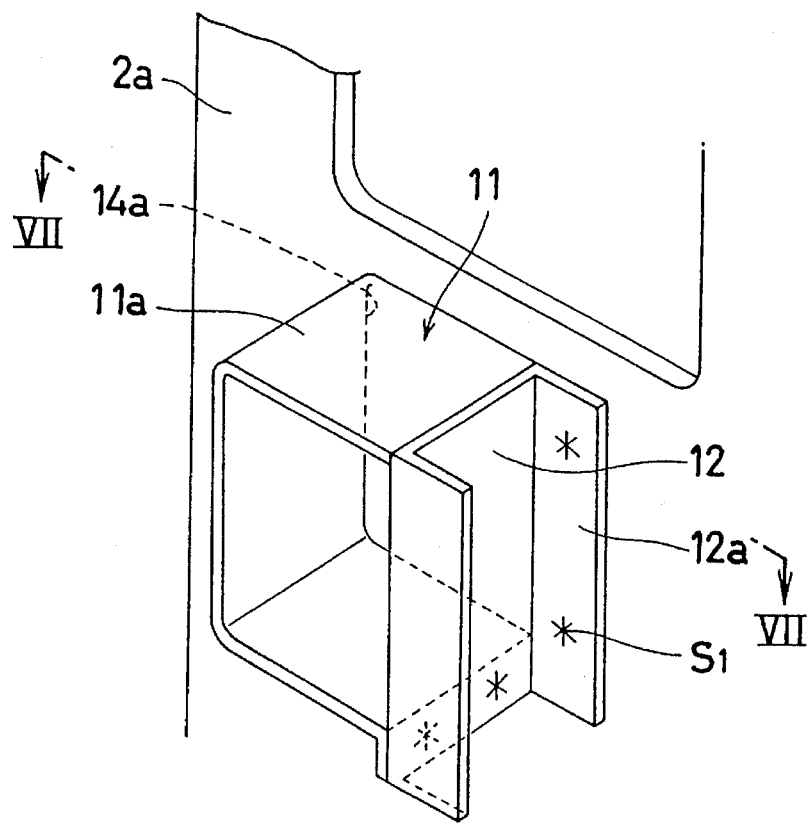
FIG. 6 is a perspective view of the main part of the conventional front body structure of the motor vehicle.
Figure 7:
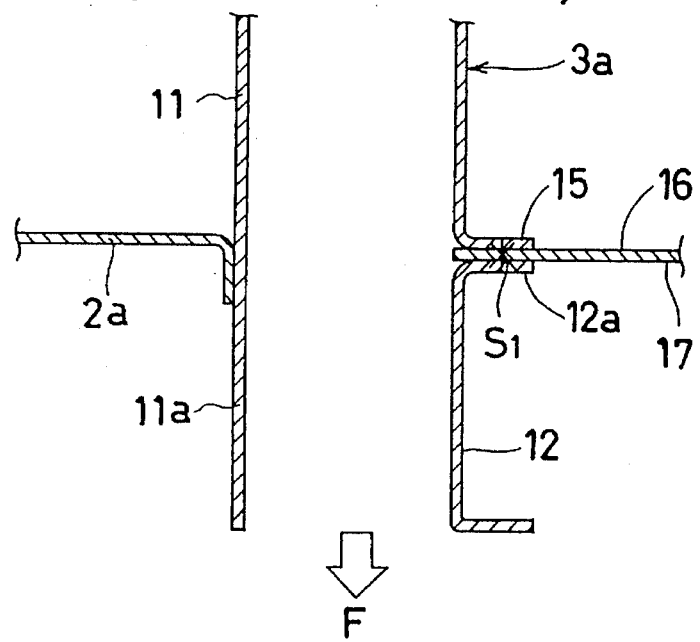
FIG. 7 is a sectional view taken along the line VII—VII of FIG. 6.

One embodiment of the present invention will be described below with reference to FIGS. 1 to 3. In FIGS. 1 to 3, the same reference numerals are applied to essentially the same elements as those of FIGS. 4 to 7, and the detailed description of the elements is omitted.

FIG. 1 shows a front body structure of a motor vehicle in accordance with the present invention. In this embodiment, an extension member 12 is subassembled and welded beforehand to a fender apron 3a, 3b.

The extension member 12 comprises a planar base portion 20 and bent portions 21 and 22 formed into a bent form at the upper and lower ends of the base portion 20, respectively, as shown in FIG. 2. The extension member 12 is arranged corresponding to the front end 11a of an apron side member 11 of the fender apron 3a, 3b. The aforementioned bent portion 21 is welded to an upper wall portion 23 of the apron side member 11 having a substantially U-shaped cross section by spot welds $S_2$. The lower edge portion 24 of the extension member 12 is welded to the lower end suspending portion 25 of the apron side member 11 by spot welds $S_3$.

The rear end portion 26 of the extension member 12 is joined to the front end portion 27 of an apron body 10 of the fender apron 3a, 3b as shown in FIGS. 2 and 3. The interface P between the rear end portion 26 and the front end portion 27 is disposed substantially in the front and rear direction (the longitudinal direction) of the vehicle body, and the interface P is welded at several places by spot welds $S_4$.

Thus, the extension member 12 is subassembled to the fender apron 3a, 3b before a front end assembly 8 is assembled to the vehicle body. A closed cross section shape portion 30 is formed by the extension member 12 and the front end portion 11a of the apron side member 11 to provide a reinforcing structure.

The fender aprons 3a and 3b thus constructed are installed at the right and left sides of an engine room 1, and the front end assembly 8 is assembled to the fender aprons 3a and 3b in such a manner as described below.

The closed cross section shape portion 30 consisting of the front end portion 11a of the fender apron 3a, 3b and the extension member 12 is inserted into an opening 14a, 14b of a lamp support panel 2a, 2b, which composes part of the front end assembly 8. The closed cross section shape portion 30 protrudes to the front side of the lamp support panel 2a, 2b. As shown in FIG. 3, the bent portion 15 formed at the front end portion 27 of the apron body 10 is joined to the rear face 16 of the lamp support panel 2a, 2b and welded by spot welds $S_5$.

Further, as shown in FIG. 2, a towing hook 34 having an engagement hole 33 is welded by spot welds $S_6$ to the bent portion 22 at the lower side of the extension member 12, the bent portion 31 of the apron body 10, and the lower edge portion 32 thereof.

With the front body structure thus constructed, the welded portion of spot welds $S_4$ at the interface P between the rear end portion 26 and the front end portion 27 of the apron body 10 is in the shearing direction with respect to the pulling force F in FIG. 3, so that when a load (pulling force) acts on the towing hook 34 in towing the vehicle, the load acts as a shearing force at the spot welded portion. Therefore, this structure is not affected by the pulling force of the towing hook 34.

Also, in this embodiment, the extension member 12 is subassembled to the fender panel 3a, 3b beforehand, so that only assembling of front end assembly 8 to the fender panels 3a and 3b is required for assembling the front portion of the vehicle body. Therefore, the jigs for assembling can be simplified.

Although one embodiment of the present invention has been described above, the present invention is not limited to the above-described embodiment, and various changes and modifications can be made in light of the above teachings. For example, the shape etc. of the extension member 12 or the fender apron 3a, 3b can be changed variously if necessary. The joining means of the extension member 12 is not limited to spot welding. It is needless to say that the present invention can be applied to the case where arc welding etc. is used for welding the parts.

As described above, according to the present invention, the fender apron is welded to the lamp support panel in the condition where the interface between the extension member and the fender apron is disposed substantially in the front and rear direction of the vehicle body, so that when a load is applied to the extension member in the front and rear direction of the vehicle body, the load acts as a shearing force on the welded portion of the extension member and the fender apron. Therefore, the present invention provides a structure which is not affected by a pulling force in the front and rear direction applied to the extension member via the towing hook etc., and prevents the extension member from being separated from the fender apron.

Further, according to the present invention, the extension member is subassembled to the fender apron beforehand, so that the number of assembled parts is decreased, by which assembling work can be performed easily and the jigs for assembling can be simplified in assembling the front portion of the vehicle body.

We claim:

1. A front body structure for a motor vehicle in which an apron side member composing part of a fender apron is inserted into an opening of a lamp support panel disposed at each side of a vehicle body, and is protruded through said lamp support panel, and said lamp support panel, said fender apron, and an extension member are welded in the condition where said extension member is disposed to said protruded apron side member, wherein said extension member is subassembled to said fender apron by welding said extension member to said fender apron, said extension member and said fender apron being joined at an interface, and said fender apron is welded to said lamp support panel in the condition where said interface between said extension member and said fender apron is disposed substantially in the longitudinal direction of the vehicle body, so that when a load in the longitudinal direction is applied to said extension member, said load acts as a shearing force on the welded portion of said extension member and said fender apron and a towing hook is welded to said fender apron and said extension member.

2. A front body structure for a motor vehicle according to claim 1 wherein said extension member is welded to said apron side member disposed at the side of said fender apron.

3. A front body structure for a motor vehicle according to claim 1 wherein said extension member includes upper and lower ends and a bent portion along its lower end, said towing hook being welded to said bent portion.

4. A front body structure for a motor vehicle according to claim 3 wherein said apron includes a front surface, an apron bent portion attached to said front surface and an apron lower edge portion, said towing hook also being welded to said apron bent portion.

5. A front body structure for a motor vehicle according to claim 4 wherein said towing hook is also welded to said apron lower edge portion.

6. A front body structure for a motor vehicle according to claim 1 wherein said towing hook includes an engagement hole.

* * * * *